Patented July 11, 1939

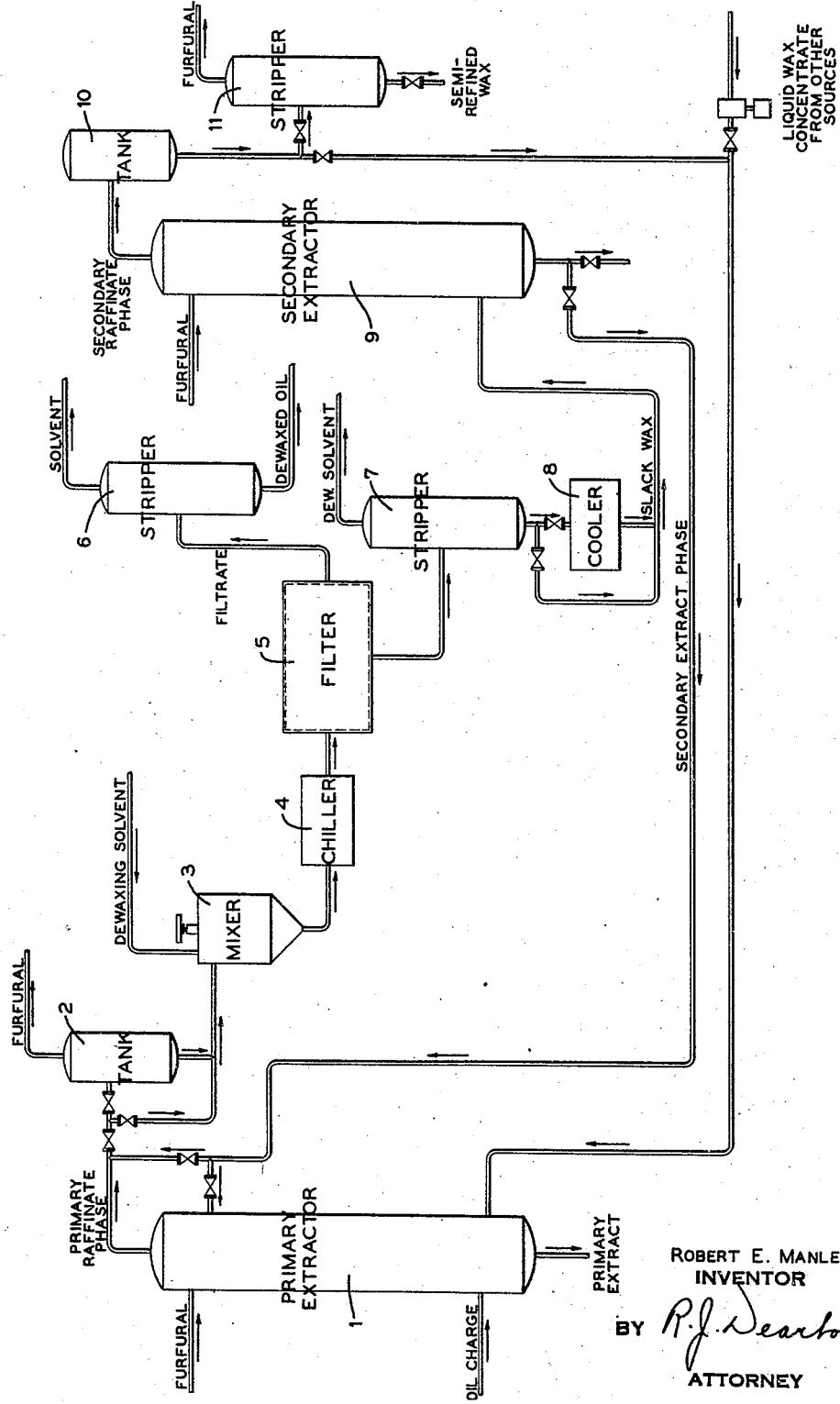

2,165,638

UNITED STATES PATENT OFFICE 2,165,638

REFINING HYDROCARBON OIL

Robert E. Manley, Beacon, N. Y., assignor to The Texas Company, New York, N. Y., a corporation of Delaware Application February 19, 1937, Serial No. 126,537

2 Claims. (Cl. 196—13)

This invention relates to the treatment of hydrocarbon oil, and more particularly to the treatment of wax-bearing mineral lubricating oil fractions for the production therefrom of low pour test lubricating oil and refined wax.

The invention contemplates a process in which wax-bearing mineral oil is subjected to a preliminary refining operation to remove unsaturated or low viscosity index constituents. Thereafter, the partially-refined oil is dewaxed to produce low pour test lubricating oil and a slack wax. This slack wax, containing some oil, is then extracted with furfural at elevated temperature to effect removal of the oil constituents, and thereby produce a semi-refined wax. This semi-refined wax can then be subjected to sweating, vacuum distillation, or fractional separation, by means of solvents, in order to produce wax of desired melting point range.

The extraction of the slack wax is advantageously effected by countercurrent contact with furfural in a packed tower whereby separation into phases at elevated temperature is effected. The insoluble phase comprises the semi-refined wax in a liquid condition, mixed with a small amount of furfural. The furfural is advantageously removed by stripping in a suitable distilling apparatus. The soluble phase, on the other hand, consists of the oil constituents of the slack wax together with a small amount of wax dissolved in the main body of furfural.

Since this soluble phase contains wax, it is advantageously returned to the dewaxing zone wherein it is mixed with the wax-bearing oil undergoing dewaxing. Where the wax-bearing oil is subjected to a preliminary refining operation consisting of solvent extraction with furfural, this soluble phase may be returned to the zone of such extraction wherein the charge oil is extracted with furfural in the presence of this soluble phase being returned from the treatment of the slack wax, and as will be more fully described below.

The invention also contemplates effecting the initial extraction of wax-bearing oil with furfural in the presence of deoiled slack wax or liquid petrolatum, the object being to use the liquid petrolatum or slack wax as a solvent for paraffinic constituents of the oil undergoing treatment.

The high molecular weight hydrocarbons, of which liquid petrolatum or deoiled slack wax are composed, are relatively immiscible with furfural at temperatures in the range 150° to 230° F. On the other hand, the relatively paraffinic liquid constituents of the wax-bearing oil undergoing treatment are more soluble in the deoiled slack wax or liquid petrolatum than they are in the extraction solvent. Hence, by effecting solvent extraction of the oil in the presence of slack wax or liquid petrolatum, the phase distribution ratio is modified so that the oil constituents of intermediate character, that is, those liquid constituents which are relatively paraffinic, accumulate in the raffinate phase in preference to the extract phase.

My invention is of particular interest with respect to the treatment of slack wax, such as normally resulting from the dewaxing of wax-bearing mineral lubricating oil to produce therefrom a semi-refined wax relatively free from oil.

An object of my invention, therefore, is to treat the slack wax with a selective solvent of the type such as furfural so as to remove substantially all of the oil constituents of slack wax, and thereby render the slack wax in a condition more suitable for the subsequent steps of sweating, fractional distillation, or solvent separation.

I have found that furfural is particularly suitable for this purpose because it exerts selective action as between the wax and oil constituents of the slack wax at temperatures of around 290° to 300° F. The solvent is sufficiently selective as between these constituents of slack wax to permit obtaining a substantially complete separation between wax and oil, particularly when the treatment is effected in a countercurrent type of operation.

In order to further illustrate my invention, reference will now be made to the accompanying drawing showing a flow diagram representing one method for carrying out the process.

As shown in the drawing, wax-bearing lubricating oil stock, from a source not shown, is introduced to the lower portion of a primary extraction tower 1, while furfural, also from a source not shown, is introduced to the upper portion of this tower. The furfural is introduced to the tower in the proportion of about two parts of furfural to one part of oil. The tower is maintained at an elevated temperature in the range 200° to 270° F. Preferably, the temperature at the top of the tower is maintained substantially above that at the bottom of the tower so as to permit a temperature gradient of around 50° F. or more throughout the tower. The temperature conditions can be maintained by regulating the temperature of the incoming solvent and oil charge.

Countercurrent contact between furfural and oil takes place in the tower with separation into extract and raffinate phases. The extract phase collecting in the bottom of the tower is removed as a primary extract phase and may be withdrawn from the system.

The primary raffinate phase collecting in the top of the tower comprises high viscosity index oil and wax mixed with some solvent. This mixture may be conducted to a stripper 2 for the purpose of stripping out the solvent. Instead, however, the mixture may be passed directly to a mixer 3 preparatory to dewaxing.

If the wax-bearing charge is a relatively low viscosity oil, having a Saybolt Universal viscosity, for example, of about 40 seconds at 210° F., it may be dewaxed using the furfural contained in the primary raffinate phase as a component of the dewaxing solvent mixture, the furfural functioning as an anti-solvent for the wax constituents. On the other hand, where the charge is more viscous, it may be desirable to use some other wax anti-solvent liquid, such as methyl ethyl ketone, in which case the furfural is stripped from the primary raffinate phase in the stripper 2, already mentioned.

In the mixer 3, wax-bearing oil is mixed with additional solvent liquid, including benzol or some other auxiliary solvent liquid of this character. Where the furfural has been removed, the dewaxing solvent will then include a wax anti-solvent liquid, such as an aliphatic ketone, in addition to the benzol. The anti-solvent liquid and benzol or auxiliary solvent are mixed with the primary raffinate oil in such proportions that at temperatures of 0° F. and below, the solvent mixture has substantially complete solvent action upon the liquid hydrocarbon constituents and substantially no solvent action upon the solid hydrocarbons.

This mixture of oil and solvent is conducted from the mixer 3 through a chiller 4 wherein it is cooled to the dewaxing temperature, usually in the range 0° to −20° F. The chilled mixture is then introduced to the filter 5 wherein the solidified wax hydrocarbons are removed as a filter cake, thereby producing a dewaxed filtrate comprising oil having a pour test of around 0° F. and below, dissolved in the solvent liquid mixture.

This filtrate is withdrawn and conducted to a stripper 6 wherein the solvent is stripped from the dewaxed oil.

The filter cake formed in the filter 5, and preferably after washing in situ with fresh wash solvent, is withdrawn and conducted to a stripper 7. In this stripper, the dewaxed solvent liquid is removed, leaving behind a slack wax.

This slack wax at a temperature of around 300° F. is withdrawn and, if desired, conducted through a cooler 8, all or in part, and from there introduced to the lower portion of a secondary extraction tower 9. In this extraction tower, the slack wax is brought into countercurrent contact with furfural being introduced to the upper portion of the tower. The top of the tower is maintained at around a temperature of 285° to 320° F. while the bottom of the tower may be maintained at a temperature of around 270° to 290° F. These temperatures are maintained by proper control of the temperatures of the incoming furfural and slack wax.

The insoluble phase accumulating in the upper part of the tower comprises liquefied wax substantially free from oil and mixed with some furfural. This insoluble, or secondary raffinate phase, is withdrawn and conducted to a tank 10 and from there to a stripper 11 wherein the furfural is stripped from the wax to produce semi-refined wax.

A portion of this secondary raffinate phase may be recycled through the system, however, by introducing it to the bottom part of the primary extraction tower 1. This material being so returned, being relatively free from oil, exerts a preferential solvent action for the paraffinic constituents of light chemical nature contained in the primary extract phase accumulating in the bottom of the tower 1. In this way, the primary extract phase is denuded of a substantial portion of relatively paraffinic constituents of the oil which would otherwise be carried out of the system in the primary extract phase.

Referring again to the extraction tower 9, the secondary extract phase collecting in the bottom of the tower 9 comprises oil constituents of the slack wax together with some wax dissolved in the solvent. This material may be withdrawn from the system at this point, or it may advantageously be returned to the upper portion of the primary extraction tower 1. The material so returned contains a large amount of furfural, and advantage is taken of the furfural so returned as an extracting medium in the primary extraction tower, which is at a temperature somewhat lower than that prevailing in the secondary extraction tower 9.

On the other hand, this secondary extract phase can be subjected directly to dewaxing, in which case it may be mixed with the primary raffinate phase, leaving the top of the primary extraction tower 1, as is indicated in the drawing.

The ratio of furfural to slack wax introduced to the secondary extraction tower 9 will depend upon the nature and character of the slack wax undergoing treatment, and also to some extent upon the degree of oil removal desired. Usually, however, the furfural will be employed in the ratio of about one to four parts of furfural to one part of slack wax.

Also, as indicated in the drawing, it may be desirable to use a wax concentrate from some other source as the paraffinic solvent introduced to the lower portion of the primary extraction tower 1. Such material may be used in place of the semi-refined wax product produced in the secondary extraction tower 9.

While certain solvent proportions have been set forth above, it is contemplated that these may be varied somewhat, depending upon the nature of the oil and slack wax undergoing treatment, as well as upon the degree of separating action desired.

The process, as above described, is particularly applicable to the treatment of wax-bearing lubricating oil fractions ranging in Saybolt Universal viscosity from about 40 seconds to 130 seconds or heavier at 210° F. It may be desirable, however, in the case of less viscous wax-bearing fractions to modify the foregoing procedure somewhat. For example, when a wax-bearing fraction having a viscosity below 40 Saybolt Universal seconds at 210° F. is being processed, the raffinate phase removed from the primary extractor 1 may, without the addition of any further solvent, be subjected directly to dewaxing by chilling and filtering, according to the conventional cold-pressing operation. The filtrate so obtained will then be stripped in the stripper 6 to remove the solvent. The resulting wax cake will retain a small amount of furfural, and may be introduced directly to the secondary extractor 9 after heating to the desired temperature of around 270° F., thus eliminating the necessity for stripping any solvent from the slack wax prior to introduction to the secondary extractor 9.

Obviously, many modifications and variations of the invention, as hereinbefore set forth, may be made without departing from the spirit and scope thereof, and therefore only such limitations should be imposed as are indicated in the appended claims.

I claim:

1. The method of treating wax-bearing mineral oil to produce low pour test oil and semi-refined wax which comprises extracting the wax-bearing oil in a primary extraction zone, forming a primary extract phase containing low viscosity index constituents dissolved in the solvent and a primary raffinate phase comprising high viscosity index constituents and wax, removing the two phases, dewaxing the primary raffinate phase to produce oil of low pour test and a slack wax comprising wax and some oil, extracting said slack wax by continuous countercurrent contact with furfural at elevated temperature such that the slack wax is deoiled while in a liquid condition, forming a secondary raffinate phase consisting essentially of deoiled wax and some furfural and a secondary extract phase comprising oil and some wax dissolved in the solvent, and returning a portion of said secondary raffinate phase to the primary extraction zone.

2. The method of treating wax-bearing mineral oil to produce low pour test oil and semi-refined wax which comprises extracting the wax-bearing oil in a primary extraction zone, forming a primary extract phase containing low viscosity index constituents dissolved in the solvent and a primary raffinate phase comprising high viscosity index constituents and wax, removing the two phases, dewaxing the primary raffinate phase to produce oil of low pour test and a slack wax comprising wax and some oil, passing the slack wax through a secondary extraction zone in continuous countercurrent contact with a solvent comprising furfural, maintaining said secondary extraction zone at a temperature of around 270 to 320° F. such that the slack wax is deoiled while in a liquid condition, removing from one end of said secondary extraction zone liquefied wax substantially free from oil while removing from the opposite end thereof oil dissolved in the bulk of the solvent, and returning a portion of said liquefied wax to the primary extraction zone.

ROBERT E. MANLEY.